United States Patent
Drossel et al.

(10) Patent No.: US 10,393,092 B2
(45) Date of Patent: Aug. 27, 2019

(54) METHOD AND SYSTEM FOR CONTROLLING THE ACTIVE POWER OUTPUT OF A WIND FARM

(71) Applicant: Nordex Energy GmbH, Hamburg (DE)

(72) Inventors: Detlef Drossel, Norderstedt (DE);
Florian Bode, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 0 days.

(21) Appl. No.: 15/919,587

(22) Filed: Mar. 13, 2018

(65) Prior Publication Data

US 2018/0258913 A1     Sep. 13, 2018

(30) Foreign Application Priority Data

Mar. 13, 2017  (EP) .................................... 17160518

(51) Int. Cl.
| | | |
|---|---|---|
| *F03D 7/04* | (2006.01) | |
| *H02J 3/46* | (2006.01) | |
| *H02J 3/38* | (2006.01) | |
| *H02J 3/48* | (2006.01) | |

(52) U.S. Cl.
CPC .............. *F03D 7/048* (2013.01); *H02J 3/386* (2013.01); *H02J 3/46* (2013.01); *H02J 3/48* (2013.01); *Y02E 10/763* (2013.01)

(58) Field of Classification Search
CPC .............. F03D 7/048; H02J 3/386; H02J 3/46
See application file for complete search history.

(56) References Cited

U.S. PATENT DOCUMENTS

| | | | | |
|---|---|---|---|---|
| 6,600,240 B2* | 7/2003 | Mikhail | ................ | F03D 7/0224 307/85 |
| 8,046,110 B2* | 10/2011 | Mayor | .................. | F03D 7/0284 290/44 |
| 8,346,400 B2* | 1/2013 | Gonzalez Senosiain | | .................... G05F 1/67 290/44 |
| 9,709,037 B2* | 7/2017 | Sagi | ........................ | F03D 7/048 |
| 2007/0047163 A1* | 3/2007 | Lutze | .................... | F03D 7/0284 361/78 |
| 2017/0009740 A1* | 1/2017 | Geisler | .................... | H02J 3/386 |

FOREIGN PATENT DOCUMENTS

| | | |
|---|---|---|
| DE | 102014000784 A1 | 7/2015 |
| DE | 102014000790 A1 | 7/2015 |

\* cited by examiner

*Primary Examiner* — Sean Gugger
(74) *Attorney, Agent, or Firm* — Barclay Damon LLP

(57) ABSTRACT

A method for controlling an active power in a wind farm having at least two wind turbines that supply active power comprises inputting a setpoint value for the active power of the wind farm into a wind farm model. The wind farm model outputs a modeled active power setpoint value. A system deviation is determined and input into a power controller, which outputs a controller manipulated variable. A feedforward control manipulated variable is determined independently of states of the wind farm or the active power. An overall manipulated variable is determined for the wind farm as the sum of the controller manipulated variable and the feedforward control manipulated variable. A correction value is determined based on the difference between the actual value of the active power and the modeled active power setpoint value and input into the wind farm model.

11 Claims, 3 Drawing Sheets

METHOD AND SYSTEM FOR CONTROLLING THE ACTIVE POWER OUTPUT OF A WIND FARM

CROSS REFERENCE TO RELATED INVENTION

This application is based upon and claims priority to, under relevant sections of 35 U.S.C. § 119, European Patent Application No. 17 160 518.1, filed Mar. 13, 2017, the entire contents of which are hereby incorporated by reference.

BACKGROUND

The present invention relates to wind farm control system for a wind farm that comprises at least two wind turbines and a method for controlling the active power output of a wind farm.

With increasing use of wind turbines, whether on land or at sea, the importance thereof to the electrical power supply increases. In view of feeding active power, predetermined setpoint values for the active power supplied at the power grid node should be observed as exactly as possible. This relates to both the stationary state in which—provided there is enough wind—a constant absolute value of active power is supplied and the dynamic behavior in which a setpoint value for the active power to be supplied varies over time.

DE 102014000790 A1 has disclosed a wind farm closed-loop control with an improved setpoint value behavior. The wind farm has a farm master having a power controller for controlling the wind turbines contained in the wind farm. A setpoint value for the power output of the wind farm is present or input at the farm master and said setpoint value is output as a setpoint value signal for the power output of the wind turbines. The setpoint values for the wind turbines are corrected if there is a change in the setpoint value signal for the wind farm, with the corrected setpoint value being applied to the power controller. The setpoint value for the wind turbine is calculated using a predictor, with different operating states of the wind turbines and differently produced power being taken into account here.

DE 102014000784 A1 has disclosed a wind farm with a feedforward control in the power controller. The wind farm has a farm master embodied to control the wind turbines, the farm master comprising a power controller. The power controller has a feedforward control module which applies a measure for the setpoint power to the output of the power controller by way of a multiplication member. This is intended to obtain an accelerated response behavior of the feedforward control in the case of a setpoint value reduction and create a response behavior that is robust in relation to the operating state of the wind farm.

BRIEF SUMMARY OF THE INVENTION

The invention is directed to specifying a controlling method for a wind farm and a wind farm which follow a setpoint value input as closely as possible both in stationary and transient behavior.

A method for controlling the active power output of a wind farm having at least two wind turbines which feed active power into a power supply network comprises determining a setpoint value for the active power to be output by the wind farm to a wind farm model. The wind farm model determines a modeled active power setpoint value. A system deviation is determined by the difference between the modelled active power setpoint value and the an actual value of the active power. The system deviation is output to a power controller. A feedforward control manipulated variable is determined from the freeforward controller and is added, in additive fashion, to a controller manipulated variable of the wind farm control system. The feedforward control manipulated variable is independent of the states of the wind farm and its actual values and only depends on the setpoint value for the active power of the wind farm. An overall manipulated variable for the wind farm is formed from the controller manipulated variable and the feedforward control manipulated variable by addition.

According to an embodiment, a difference is determined between the actual value of the active power and the modeled active power setpoint value and represents a correction value for determining the modeled active power setpoint value. The modeled active power setpoint value of the wind farm can be corrected in a manner dependent on a deviation between the actual value of the active power and the modeled active power setpoint value such that deviations in the model, caused by operating and work points of the wind turbines in the farm, can be compensated for. By way of the modeled active power setpoint value, the model produces the value for the active power which the wind farm would supply in response to the setpoint value input. Preferably, this correction achieves a more accurate control behavior of the wind farm, which can then follow external setpoint value inputs more closely. Consequently, it is possible to effectively minimize disturbances in an electrical power supply network supplied with power by the wind farm.

In an embodiment, the correction value minimizes a deviation between the modeled active power setpoint value and the actual value of the active power of the wind farm. As a result of the correction value being based on the difference between the modeled active power setpoint value and the actual value, the correction value depends on the deviations of the model from the real behavior of the wind farm or the individual wind turbines of the wind farm. If there is no deviation, the correction value is zero and so the model is not corrected.

In an embodiment, the power controller is configured to correct disturbances. As a result of the feedforward control, the actual value directly follows the setpoint value and the power controller can be optimized for correcting disturbances.

In a further embodiment, the correction value corrects a dependence of the modeled active power setpoint value on an operating point of the wind farm. The model of the wind farm, which model forms the basis for the modeled active power setpoint value, is largely independent of an operating point such as, for example, the actual value of the supplied active power. By way of the correction value, it is possible to resolve the remaining dependence on the operating point in the model.

In an embodiment, the overall manipulated variable assumes a value of zero in the stationary state where the modeled active power setpoint value and the actual value of the active power correspond to one another. There is a correction of the disturbances occurring in the wind farm by virtue of the overall manipulated variable then having a value of zero. Hence, a transfer function of the reference variable is decoupled from the disturbance transfer function.

In an embodiment, one or more filters are used, for example for temporal smoothing of the modeled active power setpoint value and also of the actual value for the active power.

In an embodiment, the wind farm has at least two wind turbines and a wind farm control system. The wind farm control system has a power controller which forms a controller manipulated variable for the active power of the wind farm. A feedforward control forms or determines a feedforward control manipulated variable independently of states of the wind farm and its actual values. A model determines a modeled active power setpoint value from a setpoint value for the active power of the wind farm. The modeled active power setpoint value is present or input into at a power controller which outputs a controller manipulated variable. In the wind farm control system, the feedforward control manipulated variable is applied to the power controller in a manner added to the controller manipulated variable.

In an embodiment, a correction module is configured to determine a correction value to be output to the model. The correction value is a difference between the modeled active power setpoint value and an actual value of the active power. The correction module determines a correction value for the model used to determine the modeled active power setpoint value. The particular advantage of the wind farm and its wind farm control system lies in the fact that the power controller may be configured to compensate for disturbance variables while the feedforward control compensates for changes in the setpoint value. Moreover, the correction value minimizes a deviation between the modeled active power setpoint value and the actual value of the active power. The model for determining the modeled active power setpoint value can be adapted by the correction value, particularly in transient states of the wind farm as well, in which the setpoint value of the active power to be supplied has changed in a discontinuous manner or along a ramp. The feedforward control guides the wind farm along the setpoint value while the power controller is arranged such that disturbance variables during the provision of the active power by the wind farm can be compensated for.

In an embodiment, one or more filters are included for the modeled active power setpoint value and/or the actual value of the active power. By way of the filter, it is possible to mask brief, i.e. high-frequency, variations, for example.

In a further embodiment, the wind farm control system apportions the whole manipulated variable into individual manipulated variables for power controllers of the wind turbines contained in the wind farm. Here, the division may take account of specific variables of the wind turbines, such as e.g. actual values of the power, regulation reserve, captured wind speed.

BRIEF DESCRIPTION OF THE DRAWINGS

The invention will be explained below on the basis of a preferred exemplary embodiment. In the figures.

DETAILED DESCRIPTION OF THE INVENTION

Figure 1:
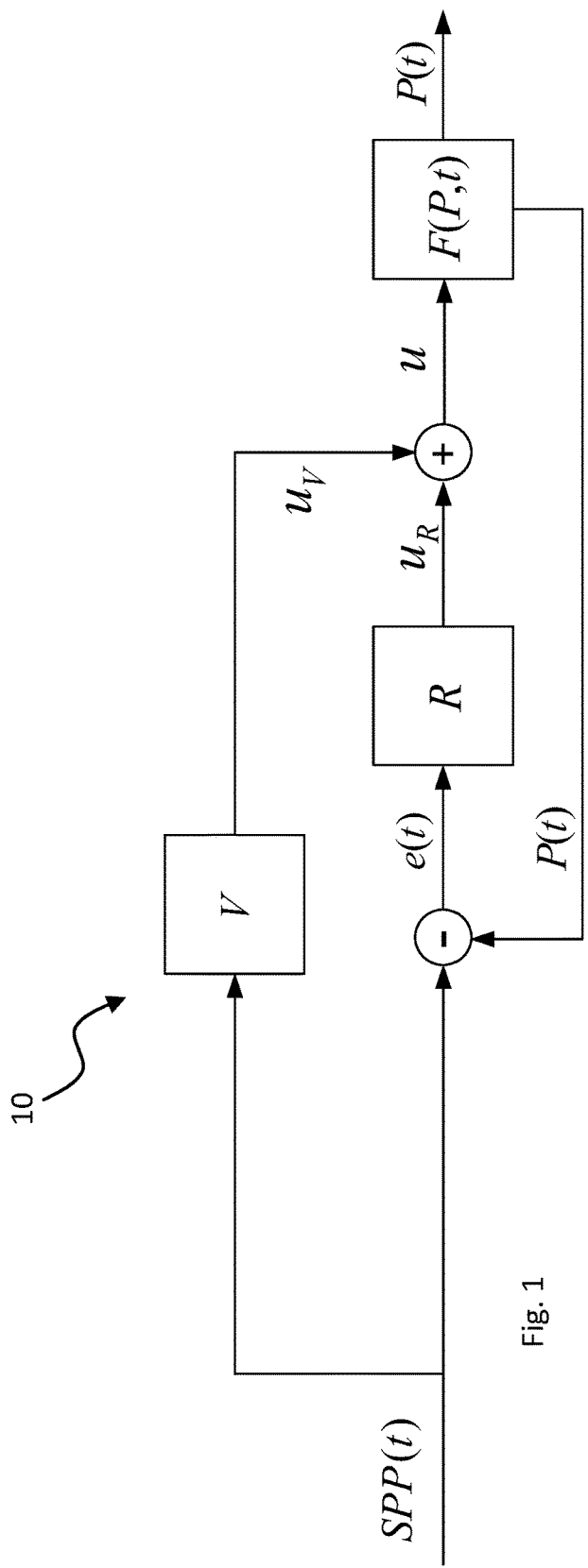
FIG. 1 illustrates a schematic view of an embodiment of a wind farm control system with simple feedforward control.

FIG. 1 shows a schematic view of a wind farm control system 10 with a simple feedforward control. The input variable is formed by the time-dependent predetermined setpoint value SPP(t) for the active power to be output. The setpoint value is present or input into a feedforward control V which determines a feedforward manipulated variable $u_V$ therefrom. At the same time, the time-dependent setpoint value SPP(t) is present or input into a subtraction member together with the actual value of the active power P(t), said subtraction member forming a system deviation e(t). The system deviation e(t) is output to a power controller R. The power controller (R) produces a controller manipulated variable $u_R$. The controller manipulated variable $u_R$ is the output variable of the power controller R. The feedforward control manipulated variable $u_V$ and the controller manipulated variable $u_R$ are present or input into an addition member and are added together to form an overall manipulated variable u. The overall manipulated variable u is present or input into the controlled system F(P,t). As shown in FIG. 1, the controlled system F(P,t) is formed by the wind farm, with the overall manipulated variable u being apportioned among the individual wind turbines in the wind farm. By way of example, the division can be effectuated on the basis of an active power reported as being available by the individual wind turbines. For the purposes of describing the exemplary embodiments, the assumption can be made that a suitable division of the overall manipulated variable u is accomplished in the controlled system F(P,t).

Figure 2:
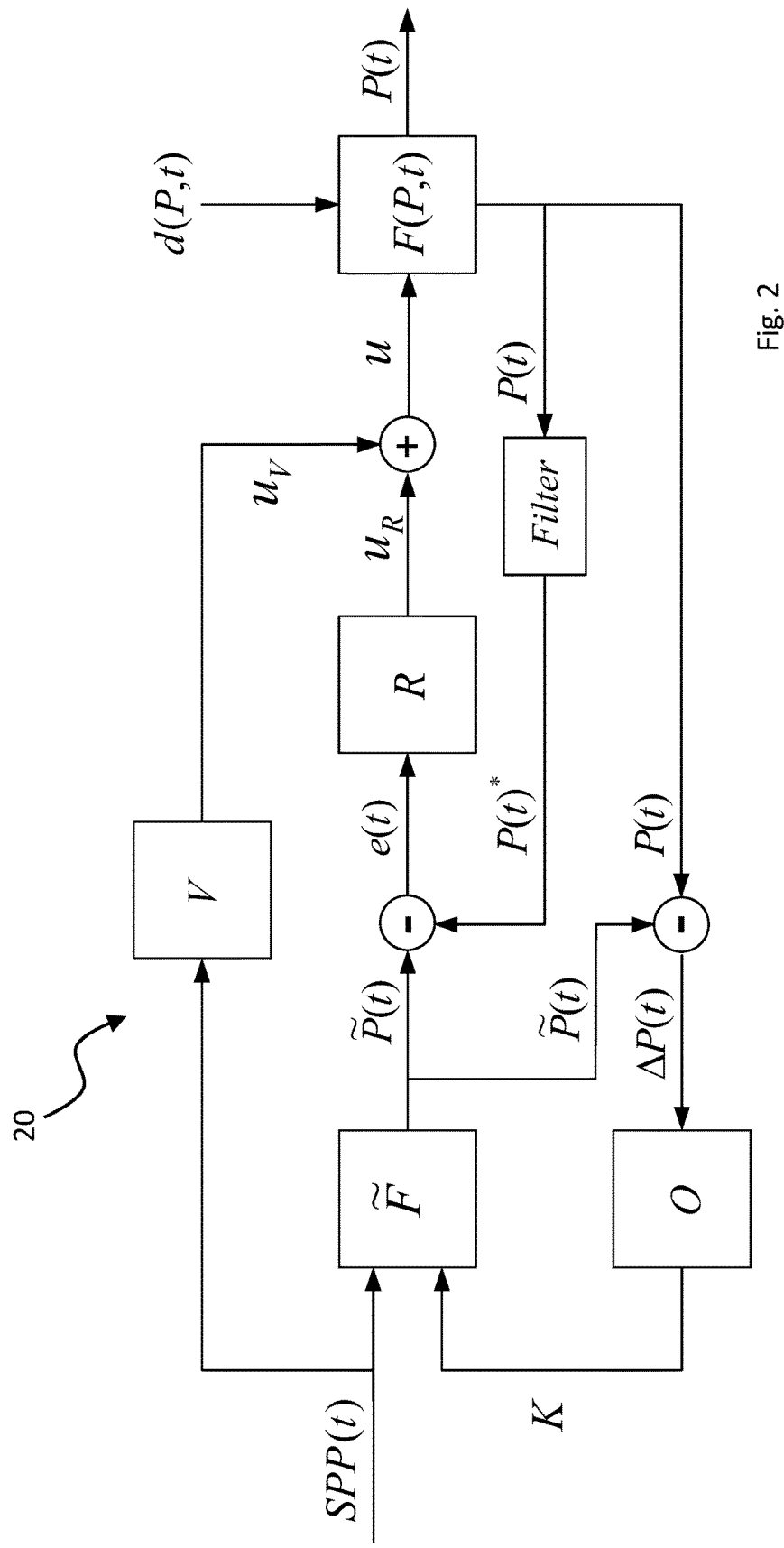
FIG. 2 illustrates a schematic view of an embodiment of a wind farm control system with feedforward control and a model of the wind farm.

The wind farm control system 20 is illustrated schematically in FIG. 2. The input variable SPP(t) is a predetermined setpoint value input which is converted by the feedforward control V into a feedforward control variable $u_V$. At the same time, the predetermined setpoint value SPP(t) is present or input into a model of the wind farm $\tilde{F}$. The model of the wind farm produces a modeled active power setpoint value $\tilde{P}(t)$. The modeled active power setpoint value $\tilde{P}(t)$ is subtracted from the actual value of the active power P(t) by a subtraction element such that a system deviation e(t) is determined. In an embodiment, a filtered value P(t)* of the actual value of the active power P(t) is present or input into the subtraction element (−) in place of the actual value of the active power P(t). The filtered P(t)* value may have been provided by a suitable filter, the filter being provided to smooth brief, i.e. high-frequency, variations in an actual value of the active power P(t) present or input into at the filter. The system deviation e(t) is input into a power controller R which determines and outputs a controller manipulated variable $u_R$. The feedforward control variable $u_V$ and the controller manipulated variable $u_R$ two manipulated variables are added by an addition element to form an overall manipulated variable u which is output as a setpoint value at the wind farm F(P,t) as a controlled system. In a manner analogous to FIG. 1, the wind farm converts the overall manipulated variable u into the active power P(t) to be output. In this approach with a feedforward control, disturbance variables d(P,t) are directly compensated for by way of the power controller R. By way of example, time variations in the wind speed and/or wind direction which influence the behavior of the individual wind turbines of the wind farm are specified as typical disturbance variables.

As shown in FIG. 2, the actual value of the wind farm active power P(t) is likewise output to a further subtraction element and the modeled active power setpoint value $\tilde{P}(t)$ is also output to the same subtraction element. The subtraction element determines an active power difference ΔP(t) between actual value and setpoint value. The difference between the two active power values ΔP(t) is output to a correction module O. The correction module O produces a correction value K which is output to the model of the wind farm $\tilde{F}$. The correction values K modifies the settings of the model F̃ in such a way that the variable ΔP(t) becomes zero. By way of the model of the wind farm F̃, which reproduces an inverse control system for the active power regulation of the wind farm, and the correction model O, the output active power values can be guided more closely to the setpoint values SPP(t); in particular, it is possible to avoid overshoots. Since the observer O is provided to reproduce the behavior of the wind farm as exactly as possible, it is expedient to provide an unfiltered value of the wind farm active power P(t) for forming ΔP(t).

In the controlling method, overall, an active power setpoint value SPP(t) is guided past the actual power controller by way of an additional path. As a result, the feedforward control manipulated variable $u_V$ is determined by way of the feedforward control V. Together with the controller manipulated variable $u_R$, the overall manipulated variable u is determined additively.

Jumps occurring in the setpoint value SPP(t) are directly applied on the controlled system and, in this case, on the wind farm F(P,t) by way of the feedforward control. The increased setpoint value SPP(t) at the actuator thus leads to a potentially shorter control time.

For the purposes of an improved swinging-in behavior onto a plateau level, use is made of the internal model F̃. Before forming the system deviation e(t), the setpoint value SPP(t) is also applied to model of the controlled system F̃. Thus, the system deviation e(t) emerges from:

$$e(t)=SPP(t)*\tilde{F}(P,t)-P(t).$$

If the model is identical to the real (inverse) controlled system, the output of the power controller is $u_R=0$ in the stationary state. If there is a change in the setpoint value SPP(t) and if the temporal behavior of F(P,t) and F̃(P,t) are identical, the system deviation continues to remain at zero. This means that the dynamics of the controller have no influence on the response to setpoint changes.

Since the wind farm cannot be represented exactly as a system and the transfer behavior changes depending on the operating point of the individual wind turbines, it is necessary to compensate an error of the model F̃. To this end, a model error for a constant correction function O is fed back onto the model F̃. The influence of disturbance variables d(P,t) in the wind farm leads to system deviation e(t), which is compensated by the power controller.

By way of the feedforward control method, it is possible to decouple the guide transfer function from the disturbance transfer function. The control variable directly follows the setpoint value SPP(t) and the power controller can be optimized for correcting disturbances. Hence, it is possible overall to follow setpoint value SPP(t) inputs more exactly and avoid deviations in the stationary state. Here, the correction time is reduced.

Figure 3:
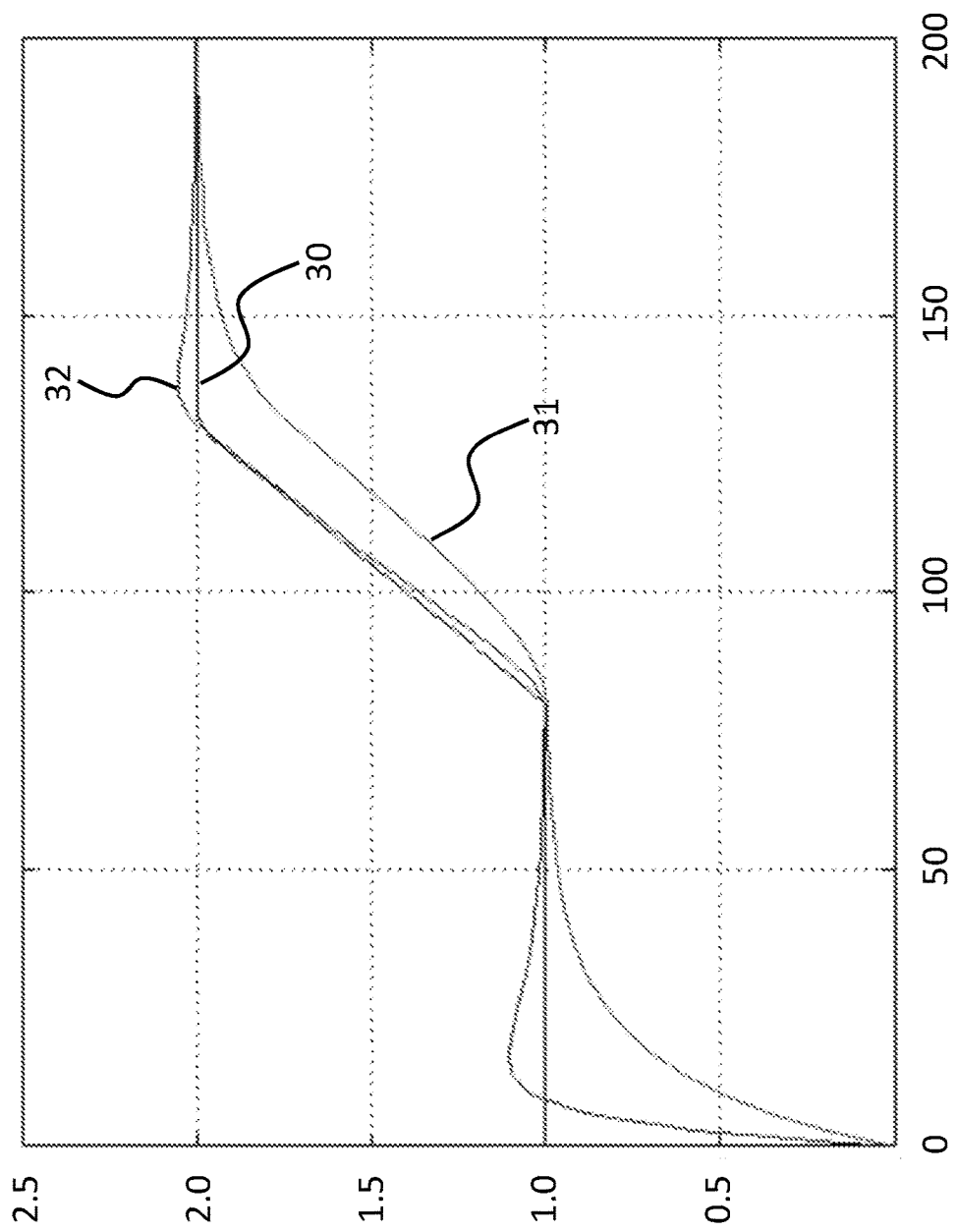
FIG. 3 illustrates an exemplary curve of the active power with feedforward control, with and without a model of the wind farm.

FIG. 3 shows the curve of the setpoint value 30 of the active power of the wind farm over time and the curve of the actual value of the active power of the wind farm using a simple feedforward control 31 according to FIG. 1 and the curve of the actual value of the active power 32 of the wind farm according to FIG. 2 or using the controlling method according to the invention on the basis of feedforward control and a wind farm model. The horizontal time axis is plotted in seconds and the vertical axis for the active power is plotted in arbitrary units. The setpoint value input SPP(t) 30 increases approximately linearly from value 1 to value 2 starting approximately at the time 80 until approximately time 130, from where it remains constant until approximately the time 200. It is clearly visible that the actual value of the active power with a simple feedforward control 31 remains significantly under the setpoint value in the region in which the setpoint value 30 of the active power increases from 1 to 2. FIG. 3 likewise shows the influence of the feedforward control and the use of the wind farm model on the setpoint value curve 32. It is clearly visible that the actual value 30 as obtained by the feedforward control clearly follows the setpoint value 30 in the region of linear increase. It is also possible to identify that only a very small overshoot occurs in the transition of the setpoint value to the plateau value by virtue of the provided active power of the wind farm being greater than the predetermined setpoint value.

LIST OF REFERENCE SIGNS

10 Wind farm control system
20 Wind farm control system
O Correction module
R Power controller
F̃ Model of the wind farm
V Feedforward control
F(P,t) Controlled system
SPP(t) Predetermined active power setpoint value of the wind farm
P̃(t) Modeled active power setpoint value
P(t) Actual value of the active power of the wind farm
P(t)* Filtered actual value of the active power of the wind farm
e(t) System deviation
ΔP(t) Active power difference
K Correction value
$u_V$ Feedforward control manipulated variable
$u_R$ Controller manipulated variable
u Overall manipulated variable for the active power setpoint value of the wind farm
d(P,t) Disturbance value
30 Setpoint value of the active power of a wind farm (SPP(t))
31 Actual value of the active power of the wind farm (P(t)) with simple feedforward control
32 Actual value of the active power of the wind farm (P(t)) with feedforward control and wind farm model

The invention claimed is:
1. A method for controlling an active power in a wind farm (F(P,t)) having at least two wind turbines that supply active power (P(t)), the method comprising:
inputting a setpoint value for the active power (SPP(t)) of the wind farm (F(P,t)) into a wind farm model (F̃) configured to output a modeled active power setpoint value (P̃(t));
determining a system deviation (e(t)) as a difference between an actual value of the active power (P(t)) and the modeled active power setpoint value (P̃(t));
inputting the system deviation (e(t)) into a power controller (R) that is configured to output a controller manipulated variable ($u_R$);
determining a feedforward control manipulated variable ($u_V$) that is determined independently of states of the wind farm (F(P,t)) or the active power (P(t));
determining an overall manipulated variable (u) for the wind farm (F(P,t)) as an as a sum of the controller manipulated variable ($u_R$) and the feedforward control manipulated variable ($u_V$);
determining by a correction module (O) a correction value (K) based on the difference between the actual value of the active power (P(t)) and the modeled active power setpoint value (P̃(t)); and inputting the correction value (K) into the wind farm model ($\hat{F}$), the wind farm model ($\hat{F}$) configured to determine the modeled active power setpoint value ($\tilde{P}(t)$) based on the correction value (K) and the setpoint value for the active power (SPP(t)) of the wind farm (F(P,t)).

2. The method according to claim 1, wherein the correction module (O) is configured to minimize a deviation between the modeled active power setpoint value ($\tilde{P}(t)$) and the actual value of the active power (P(t)).

3. The method according to claim 1, wherein the power controller (R) is configured to correct for disturbance variables (d(P,t)).

4. The method according to claim 1, wherein the correction value (K) corrects a dependence of the modeled active power setpoint value ($\tilde{P}(t)$) on an operating point of the wind farm (F(P,t)).

5. The method according to claim 1, wherein the controller manipulated variable ($u_R$) substantially reduces to zero when the wind farm (F(P,t)) is in a stationary state such that the modeled active power setpoint value ($\tilde{P}(t)$) and the actual value of the active power (P(t)) correspond to one another, and wherein the wind farm model ($\hat{F}$) is not corrected.

6. The method according to claim 1, wherein at least one of the modeled active power setpoint value ($\tilde{P}(t)$) and the actual value for the active power (P(t)) are filtered to eliminate brief variations.

7. A wind farm control system for controlling active power (P(t)) of a wind farm (F(P,t)) having at least two wind turbines, the wind farm control system comprising:
   a model ($\hat{F}$) configured to determine a modeled active power setpoint value ($\tilde{P}(t)$) from a setpoint value for the active power (SPP(t)) for the wind farm (F(P,t));
   a power controller (R) configured receive a system deviation (e(t)) input and configured to output a controller manipulated variable ($u_R$) for the active power (P(t));
   a feedforward control unit (V) configured to output a feedforward control manipulated variable ($u_V$) independently of states of the wind farm (F(P,t)) or the active power (P(t)), wherein a sum of the feedforward control manipulated variable ($u_V$) and the controller manipulated variable ($u_R$) equals an overall manipulated variable (u) for the wind farm (F(P,t)); and
   a correction module (O) configured to determine a correction value (K), based on a difference between the modeled active power value ($\tilde{P}(t)$) and an actual value of the active power (P(t)), and wherein the correction value (K) is output to the model ($\hat{F}$) configured to determine the modeled active power setpoint value ($\tilde{P}(t)$) based on the correction value (K) and the setpoint value (SPP(t)) for the active power (P(t)) of the wind farm (F(P,t)).

8. The wind farm control system of claim 7, wherein the correction value (K) minimizes a deviation of the modeled active power setpoint value ($\tilde{P}(t)$) from the actual value of the active power (P(t)).

9. The wind farm control system of claim 7, wherein the power controller (R) is configured to correct for disturbance variables (d(P,t)).

10. The wind farm control system of claim 7, further comprising one or more filters configured to filter at least one of the modeled active power value ($\tilde{P}(t)$) and the actual value of the active power (P(t)).

11. The wind farm control system of claim 7, wherein the overall manipulated variable (u) is apportioned among the at least two wind turbines.

* * * * *

UNITED STATES PATENT AND TRADEMARK OFFICE
CERTIFICATE OF CORRECTION

Page 1 of 1

PATENT NO. : 10,393,092 B2
APPLICATION NO. : 15/919587
DATED : August 27, 2019
INVENTOR(S) : Detlef Drossel and Florian Bode It is certified that error appears in the above-identified patent and that said Letters Patent is hereby corrected as shown below:

In the Claims

Column 6
Line 61, please delete "as an"

Column 8
Line 1, please change "configured receive" to -- configured to receive --

Signed and Sealed this
Fourteenth Day of April, 2020

Andrei Iancu
*Director of the United States Patent and Trademark Office*